(12) United States Patent
Meroux et al.

(10) Patent No.: US 12,502,999 B2
(45) Date of Patent: Dec. 23, 2025

(54) SYSTEMS AND METHODS TO IMPROVE TRANSPORTATION EFFICIENCIES

(71) Applicant: Ford Global Technologies, LLC, Dearborn, MI (US)

(72) Inventors: Dominique Meroux, San Francisco, CA (US); Kai Wu, Pittsburgh, PA (US); Chen Zhang, South Lyon, MI (US)

( * ) Notice: Subject to any disclaimer, the term of this patent is extended or adjusted under 35 U.S.C. 154(b) by 276 days.

(21) Appl. No.: 18/333,543

(22) Filed: Jun. 13, 2023

(65) Prior Publication Data

US 2024/0416787 A1    Dec. 19, 2024

(51) Int. Cl.
*B60L 53/64* (2019.01)
*B60L 53/65* (2019.01)
*B60L 53/66* (2019.01)

(52) U.S. Cl.
CPC .............. *B60L 53/64* (2019.02); *B60L 53/65* (2019.02); *B60L 53/665* (2019.02)

(58) Field of Classification Search
CPC ................................ B60L 53/665; B60L 53/64
See application file for complete search history.

(56) References Cited

U.S. PATENT DOCUMENTS

| | | |
|---|---|---|
| 2012/0013299 A1 | 1/2012 | Kim et al. |
| 2015/0046222 A1 | 2/2015 | Ishii |
| 2016/0072287 A1 | 3/2016 | Jia et al. |
| 2022/0144121 A1 | 5/2022 | Grunkemeyer et al. |
| 2023/0024900 A1* | 1/2023 | Ayoola .................... B60L 55/00 |
| 2023/0046454 A1* | 2/2023 | Holmes ................... B60L 53/62 |
| 2024/0217369 A1* | 7/2024 | Calabro .................. B60L 53/64 |

FOREIGN PATENT DOCUMENTS

EP    3130504 A1    2/2017

OTHER PUBLICATIONS

Prasad Prakash Malya, et al., Electric Vehicles as Distribution Grid Batteries: A Reality Check, Energy Informatics, 1st Energy Informatics Academy Conference Asia, May 29-30, 2021, pp. 1-17.

* cited by examiner

*Primary Examiner* — Navid Z. Mehdizadeh
*Assistant Examiner* — Vincent Feng
(74) *Attorney, Agent, or Firm* — Emily Drake; Eversheds Sutherland (US) LLP

(57) ABSTRACT

Systems and methods for optimizing transportation efficiency, for example, in the context of energy shortages. Techniques described herein may involve determining a high-price threshold is exceeded, identifying different vehicle types (e.g., high-efficiency vehicles, large battery capacity vehicles, etc.), prioritizing vehicles designated for charging and discharging, respectively, setting vehicle calibrations accordingly, and tracking/reporting performance relative to baselines.

20 Claims, 4 Drawing Sheets

SYSTEMS AND METHODS TO IMPROVE TRANSPORTATION EFFICIENCIES

BACKGROUND

In the context of energy shortages and volatile energy prices, larger electric vehicles with larger batteries can become a valuable source of grid arbitrage and smaller vehicles and form factors (or shared ride vehicles) become more valuable for freeing up battery capacity of larger vehicles and reducing energy consumed in transportation.

In these contexts of energy shortages and volatile energy prices, governments may choose to subsidize electricity costs, set price controls to mitigate price changes, or ask individuals to be mindful of energy use; however, the need to conserve energy does not diminish. Thus, grid arbitrage and energy-efficient transportation are more valuable to society than subsidized or controlled prices may suggest. Outcomes of considering subsidized prices alone may include inefficient consumption of electricity and shortages including limited availability of a scarce resource, including for charging electric vehicles. Connected electric vehicles have a potentially significant role to play in rapidly adjusting energy consumption from transportation and energy storage capacity.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
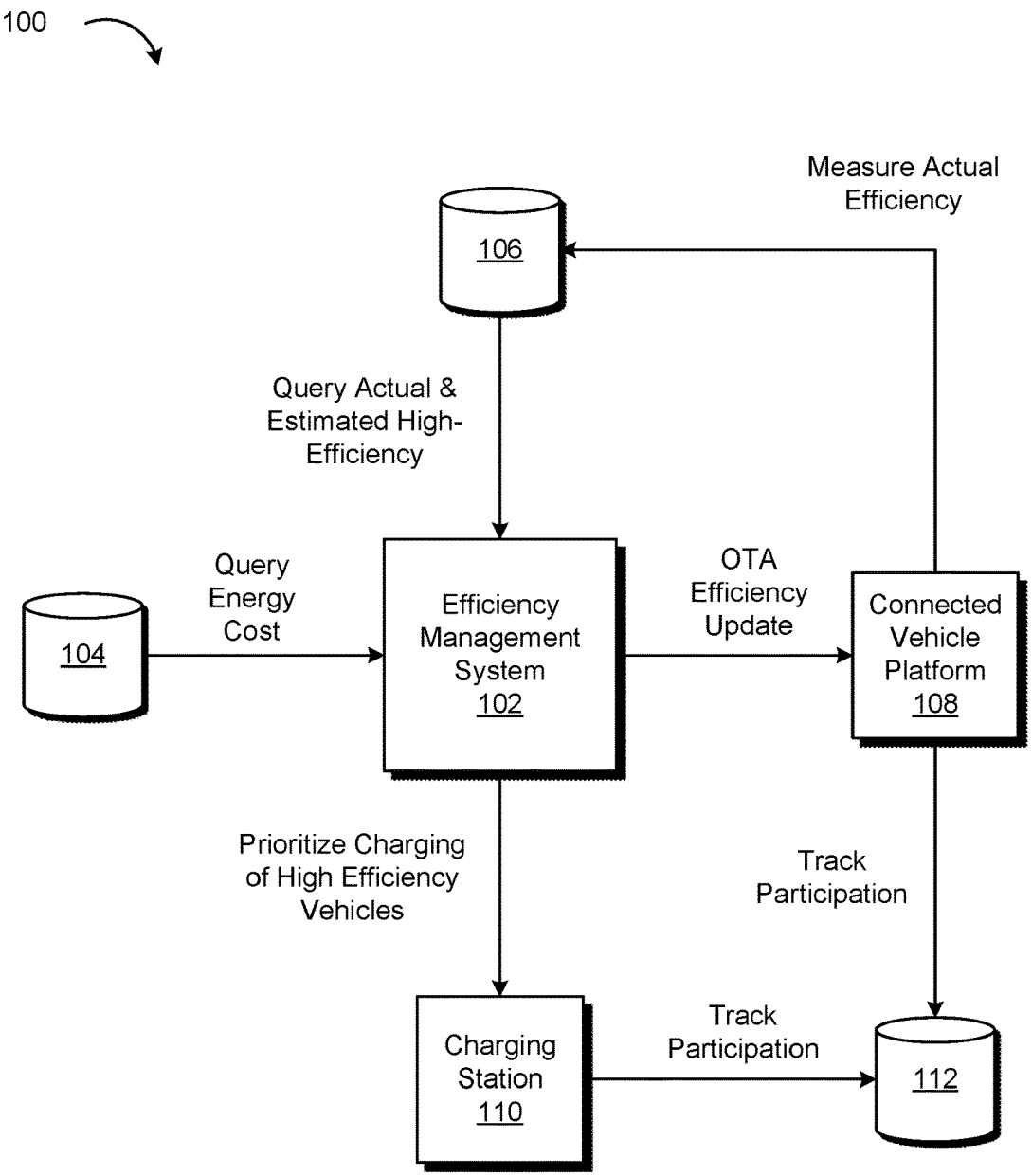
FIG. 1 illustrates a diagram depicting an example of an environment in which systems and methods for improving transportation efficiency in the context of shortages may be implemented, according to at least one embodiment of the present disclosure.

The present disclosure is directed to systems and methods for improving transportation efficiency. In various instances, high-efficiency vehicles are identified and charging of such vehicles is prioritized. Systems and methods disclosed herein may be provided to maximize transportation efficiency in contexts such as shortages by: (1) prioritizing grid arbitrage for inefficient vehicles and (2) prioritizing vehicle uptime and availability for transportation use of higher-efficiency vehicles. Customer participation and impact data can be recorded and rewarded, such as enabling unsubsidized prices for inefficient vehicles used for grid arbitrage, and priority use of electric vehicle (EV) charging for efficient vehicles. For example, inserting a temporary extra authentication in a plug-and-charge logic to bypass EV charging restrictions.

In an example embodiment, if a high-cost threshold is reached, the system sends a command to one or more vehicle controllers and connected vehicle data storage to identify a "high-efficiency" ranking of vehicles and form factors among the available vehicles. The system prioritizes "charge now" if the vehicle is designated as among high-efficiency options. The default drive mode for vehicles may be set to "high efficiency" with a potential over-the-air (OTA) delivery of a temporary ultra-efficiency mode if this is not typically available. The system tracks incremental energy loss from events where the high efficiency mode is switched off. The system also identifies "low-efficiency" ranking of vehicles and form factors, where these vehicles likely will be larger and have high battery capacities. The system sets vehicles to operate in a "battery mode" such that only necessary power-consuming modules, lighting, etc. are turned on to support bi-directional battery capacity.

In various embodiments, the system tracks and reports the efficiency of customer transportation and resulting battery capacity increased for bidirectional power transfer to enable monetary benefits (e.g., grid arbitrage of actual price of electricity and environmental impact credits, rather than a customer-facing subsidized price context), as well as non-monetary benefits (e.g., priority for electric vehicle charging if there are restrictions). The system may leverage on-vehicle message channels and compute to log calculations, track and deliver OTA updates that can enhance efficiency further specific to the driver or anticipated route's drive cycle.

The system may integrate among various vehicles and services to track complete trip efficiency, where more than one vehicle is used (such as taking a train to rideshare vehicle at a transit station nearer to the destination and displacing vehicle only trip, carpooling, use of low-speed electric vehicles or micro-mobility, etc.). The system may also enable public charging stations with bi-directional capability to be an outlet for low-efficiency vehicles, where these vehicles charging schedules can be shifted for grid arbitrage benefit. The system may be applicable to non-electric vehicles, such as a compressed natural gas (CNG) vehicles and natural gas supply or liquefied petroleum gas (LPG) vehicles with propane supply or other fuel sources such as hydrogen (e.g., as a replacement for natural gas in buildings) when it is in shortage. Further, there may be interchangeability among fuels, such as the use of hydrogen vehicles if electricity is in short supply (and high cost) or the use of battery vehicles if hydrogen is in short supply. This system can interact with hydrogen energy storage system (ESS), such as stationary fuel cell and hydrogen ESS.

FIG. 1 illustrates a diagram depicting an example of an environment 100 in which systems and methods for improving transportation efficiency in the context of shortages may be implemented, according to at least one embodiment of the present disclosure.

System 102 may refer to a server, machine, or other electronic circuitry that performs functionality described below for improving transportation efficiency. In various embodiments, system 102 is in communication with connected devices such as databases, connected vehicle platforms, edge computing servers, charging stations, and so on and so forth. System 102 may be implemented in the context of FIG. 4.

In various embodiments, database 104 refers to a data store or data service that is used to store and access energy prices. In various embodiments, the database 104 is accessible using web service application programming interface (API) calls to a remote system via a communications network such as the Internet. In some embodiments, system 102 submits web service API calls to database 104, in other embodiments, system 102 stores the energy prices locally, for example, on a hard disk drive of the system 102.

System 102 may query database 104 to determine the price of energy, such as electricity, compressed natural gas (CNG) liquidities petroleum gas (LPG), hydrogen, or other energy sources. Database 104 may store the price, availability, quantities, or other information regarding energy in a market. The current or forecasted price may be provided to system 102. If system 102 queries the market energy price and determines that the price does not exceed a high cost threshold, the system 102 may continue to operate as usual and periodically monitor the market energy price using database 104. However, if the energy price exceeds a high cost threshold, then various steps may be taken to unlock mobility efficiencies.

Responsive to a determination that the unsubsidized market energy price exceeds the high cost threshold, system 102 may query database 106 for connected vehicle data. Database 106 may be used to store vehicle data from connected vehicle platforms such as connected vehicle platform 108 illustrated in FIG. 1. The actual energy efficiency of vehicles may be measured and collected in database 106 over time. In various embodiments, connected vehicle platform 108 measures parameters that enable the estimation of the impact from possible software-enabled "high efficiency" calibration. For example, the operating characteristics and capabilities of various vehicles may be collected and used to model high-efficiency estimates of how the vehicle may be able to operate in a more energy efficient manner. The measurement and collection of the connected vehicle data in database 106 may be performed independent of the system 102 performing a determination that the market price of energy has exceeded a threshold.

System 102 may transmit messages, over-the-air (OTA) updates, or other instructions to vehicle controllers in a connected network. Connected vehicle platform 108 may receive electronic instructions to prioritize "charge now", unlock features related to carpool, carshare, and multi-modal integration, default the vehicle to a temporary high-efficiency mode of operation. In various embodiments, system 102 implements e-mobility efficiency strategies that may include a first strategy for prioritizing grid arbitrage for inefficient vehicles and/or a second strategy for prioritizing, for higher-efficiency vehicles, uptime and availability for transportation.

For example, vehicles may be ranked and/or categorized as high-efficiency vehicles based on actual and/or estimated efficiencies from database 106. In various embodiments, the high-efficiency vehicles are determined based on the actual or estimated efficiency exceeding a predefined threshold (absolute number), or based on a percentile rank relative to other vehicles. In various embodiments, the capacity and utilization of vehicles may also be considered. For example, if a first vehicle has greater capacity than a second vehicle but otherwise has similar efficiency characteristics, then the first vehicle may be prioritized over the second vehicle. In some embodiments, the categorization of a vehicle as being high-efficiency or low-efficiency accounts for the passenger rates or otherwise amortizes the energy usage across the number of actual, expected, or maximum number of occupants in the vehicle. Examples of efficiency metrics might thus include energy consumption per passenger mile traveled (PMT), or energy consumption per cargo volume and/or cargo weight. This definition of efficiency is important in ranking. For example, a full-size all-electric 15-seat van where seats are fully utilized in a vanpool application may have relatively low efficiency per vehicle mile traveled (VMT) but relatively high efficiency per PMT. If this van were to be ranked as low-efficiency and riders were to instead use single-occupant vehicles with individually lower per-VMT energy consumption but higher per-PMT energy consumption, the outcome would be higher total energy consumed thus counter-productive on a system level to achieving efficiency benefits.

In various embodiments, a strategy for prioritizing high-efficiency vehicles may involve prioritizing "charge now" behavior if the vehicle is designated as a high-efficiency option. In various embodiments, the default drive mode of vehicles may be set to a "high efficiency" mode with a potential over-the-air (OTA) delivery of a temporary ultra-efficiency mode if not typically available. Such a high-efficiency mode of operation could depend on whether the vehicle is categorized as low-efficiency for grid arbitrage or high-efficiency for transportation and depending on use case and severity of efficiency benefits required (how acute is the shortage risk) might include disabling ancillary vehicle functionality through vehicle controls, such as lighting or thermal management system. In various embodiments, incremental energy loss from events where high efficiency mode is switched off is tracked (e.g., measured, collected, and then stored in database 112). Some or all of these techniques may be applied to connected vehicle platform 108, for example, based on whether a particular vehicle is high efficiency or low efficiency.

In various embodiments, system 102 implements a strategy for prioritizing grid arbitrage for low-efficiency vehicles. System 102 may transmit message sets vehicles to operate in a "battery mode" such that ancillary vehicle functionality such as power-consuming modules, non-essential lighting, etc. are turned off to support bi-directional battery capacity. Low-efficiency vehicles may be more valuable for grid arbitrage using their batteries while smaller vehicles and shared ride vehicles may become more valuable for freeing up battery capacity of larger vehicles.

In various embodiments, charging station 110 may prioritize charging of high-efficiency vehicles (e.g., as determined by system 102). Charging station 110 may implement charging restrictions under energy shortage conditions and high-efficiency vehicles may receive a temporary extra authentication in a plug-and-charge logic to bypass charging restrictions. Low-efficiency vehicles with bi-directional capabilities may be rewarded if they were used for grid arbitrage by enabling charging for inefficient vehicles based on participation. For example, if a low-efficiency vehicle supplies X energy, then they may later reclaim X energy or a fraction thereof at a later point in time.

Database 112 may be used to track customer participation in efficiency measure(s) to unlock benefits. For example, efficiency of customer transportation may be tracked and reported, for example, showing metrics relative to a baseline. The resulting battery capacity increase for bi-directional power transfer may enable monetary benefits (e.g., grid arbitrage of actual price of electricity and environmental impact credits, rather than a customer-facing subsidized price) as well as non-monetary benefits (e.g., priority for accessing energy from charging station 110 if there are restrictions).

System 102 may integrate among various vehicles and services to track efficiency at a trip-level rather than simply based on the movement of a single mode of transportation, as a possible elaboration of a definition of efficiency using metrics like per passenger mile traveled (PMT), cargo volume, and/or cargo weight. For example, if more than one mode of transportation is used, the combined efficiency may make a vehicle or service achieve relatively higher per-PMT efficiency. In one example, if instead of driving a single-occupant vehicle, a traveler takes a train and picks up a carshare vehicle as a last-mile solution, the trip-level efficiency may be a weighted average of per-PMT efficiency for the train distance and per-PMT efficiency of the last-mile car ride. In a second example, the driver of a car connects with carpool or vanpool riders, then the per-PMT efficiency will increase because each passenger is only responsible for a fraction of the vehicle's energy consumption as well as any deviation in picking them up, relative to a single-occupant vehicle trip where the individual would be responsible for the vehicle's entire energy consumption. More generally, such multi-modal and/or shared-ride trips may include any one or more of integrating modes such as public transit, carshare, carpooling, vanpooling, rideshare, use of low-speed electric vehicles, micro-mobility including e-bikes, etc.

In various embodiments, the system 102 enables public charging stations with bi-directional capabilities (e.g., charging station 110 depicted in FIG. 1) to be used as an outlet for low-efficiency vehicles, whereby the vehicles' charging schedule can be shifted for grid arbitrage benefit. Low-efficiency vehicles may be incentivized to transfer energy to the grid through monetary and/or non-monetary means. For example, participation in grid arbitrage may grant the owner of the vehicle with access to the unsubsidized energy price instead of the typically lower customer-facing subsidized price, or may unlock additional access to public charging stations that would not otherwise be available. The owner of a low-efficiency vehicle that participates in grid arbitrage may earn credits that can be used to provide for additional charging to the owner's other, high-efficiency vehicles.

In various embodiments, a system may determine a high-price threshold is exceeded, identify different vehicle types (e.g., high-efficiency vehicles, large battery capacity vehicles, etc.), prioritize vehicles designated for charging and discharging, respectively, set vehicle calibrations accordingly, and track/report performance relative to baselines.

Figure 2:
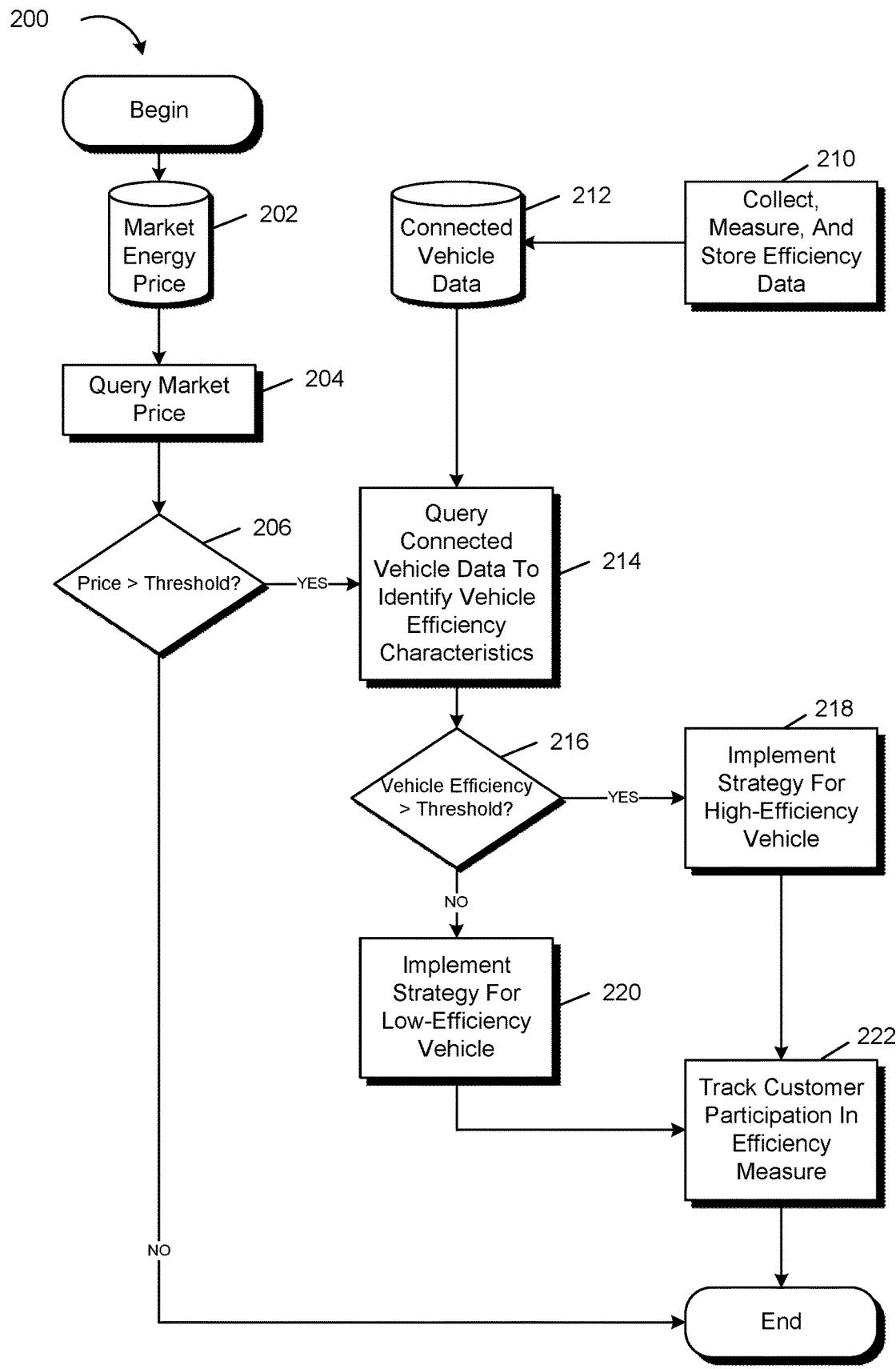
FIG. 2 illustrates a diagram depicting an example of a diagram that implements strategies for improving transportation efficiency in the context of shortages may be implemented, according to at least one embodiment of the present disclosure.

FIG. 2 illustrates a diagram depicting an example of a diagram 200 that implements strategies for improving transportation efficiency in the context of shortages may be implemented, according to at least one embodiment of the present disclosure.

A strategy for improving transportation efficiencies in the context of an energy shortage may begin at the box labeled "Begin" at the upper-left portion of FIG. 2. Market energy prices may be stored in a database 202. A system (e.g., machine) may query the market energy price 204. The market energy price database 202 may be collected periodically and at regular intervals. In some embodiments, forecasted energy prices are determined using time series analysis, machine learning models, or other forecasting models. A determination may be made regarding a current or forecasted energy price compared against a threshold energy price 206. In some cases, capacity or availability of energy may be used to determine whether a shortage exists and strategies should be implemented. Assuming that there is no shortage, the diagram may proceed to the box marked "End" at the lower-right portion of FIG. 2. However, if a shortage is determined, then some or all of the strategies described as follows may be implement.

A system may query connected vehicle data to identify vehicle efficiency characteristics 214. In various embodiments, a database 212 of connected vehicle data is queried. Connected vehicle platforms may be used to collect, measure, and store vehicle efficiency data 210. The actual energy efficiency of vehicles may be measured and collected in database 212 over time. In various embodiments, connected vehicle platforms measures parameters that enable the estimation of the impact from possible software-enabled "high efficiency" calibration. For example, the operating characteristics and capabilities of various vehicles may be collected and used to model high-efficiency estimates of how the vehicle may be able to operate in a more energy efficient manner. The measurement and collection of the connected vehicle data in database may be performed independent of the system performing a determination that the market price of energy has exceeded a threshold.

A system that is managing transportation efficiencies may query connected vehicle data to identify vehicle efficiency characteristics. In various embodiments, vehicles are ranked and/or categorized as high-efficiency vehicles based on actual and/or estimated efficiencies from database 212. In various embodiments, vehicles are categorized as high efficiency or low efficiency by comparing the vehicle efficiency against a threshold 216. In some embodiments, there are other categories of vehicle not depicted in FIG. 2 that can have other efficiency strategies associated with them—for example, middle efficiency, ultra-high efficiency, ultra-low efficiency, and so on. High-efficiency vehicles are determined based on the actual or estimated efficiency exceeding a predefined threshold (absolute number), or based on a percentile rank relative to other vehicles. In various embodiments, the capacity and utilization of vehicles may also be considered. For example, if a first vehicle has greater capacity than a second vehicle but otherwise has similar efficiency characteristics, then the first vehicle may be prioritized over the second vehicle. In some embodiments, the categorization of a vehicle as being high-efficiency or low-efficiency accounts for the passenger rates or otherwise amortizes the energy usage across the number of actual, expected, or maximum number of occupants in the vehicle.

If a vehicle's actual or projected efficiency exceeds an upper threshold for efficiency, then the system may implement strategies for high-efficiency vehicle 218. Strategies for high-efficiency vehicles may include a strategy for prioritizing high-efficiency vehicles may involve prioritizing "charge now" behavior if the vehicle is designated as a high-efficiency option, setting the default drive mode of high-efficiency vehicles to a "high efficiency" mode with a potential over-the-air (OTA) delivery of a temporary ultra-efficiency mode if not typically available, and so on and so forth. In various embodiments, incremental energy loss from events where high efficiency mode is switched off is tracked.

If a vehicle's actual or projected efficiency is below a lower threshold for efficiency, then the system may implement strategies for low-efficiency vehicle 220. In some embodiments, the upper and lower thresholds are the same threshold. In various embodiments, messages or OTA updates may be transmitted to vehicles identified as low-efficiency to operate in a "battery mode" such that ancillary vehicle functionality such as power-consuming modules, non-essential lighting, etc. are turned off to support bi-directional battery capacity. Low-efficiency vehicles may be more valuable for grid arbitrage using their batteries while smaller vehicles and shared ride vehicles may become more valuable for freeing up battery capacity of larger vehicles.

In various embodiments, a database is utilized to track customer participation in efficiency measure(s) to unlock benefits. For example, efficiency of customer transportation may be tracked and reported. The resulting battery capacity increase for bi-directional power transfer may enable monetary benefits (e.g., grid arbitrage of actual price of electricity and environmental impact credits, rather than a customer-facing subsidized price) as well as non-monetary benefits (e.g., priority for accessing energy from charging stations if there are restrictions). Efficiency may be tracked at a trip-level rather than simply based on the movement of a single mode of transportation. For example, if more than one mode of transportation is used (e.g., a traveler takes a train to a carshare vehicle at a transit station near the destination and displacing vehicle only trip, carpooling, use of low-speed electric vehicles or micro-mobility, e-bikes, etc.)

Figure 3:
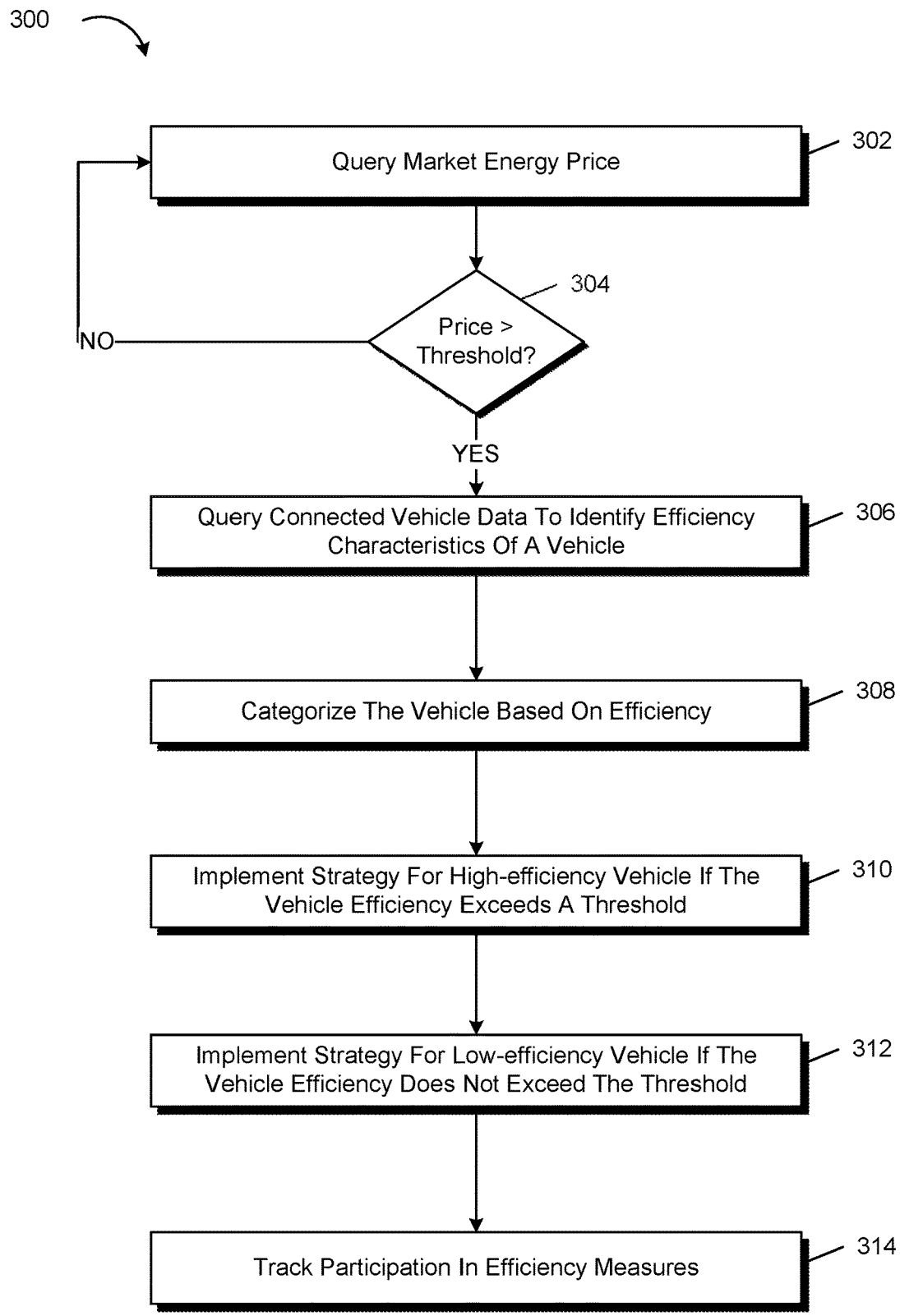
FIG. 3 shows an illustrative example of a process for implementing energy efficiency strategies, in accordance with one or more example embodiments of the present disclosure

FIG. 3 shows an illustrative example of a process 300 for implementing energy efficiency strategies, in accordance with one or more example embodiments of the present disclosure. In at least one embodiment, some or all of the process 300 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program storing a plurality of computer-readable instructions executable by one or more processors. The computer-readable storage medium, in at least one embodiment, is a non-transitory computer-readable medium. In at least one embodiment, at least some of the computer-readable instructions usable to perform the process 300 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 300 may be implemented in the context of various systems and methods described elsewhere in this disclosure, such as those discussed in connection with FIG. 1 and/or FIG. 2. In at least one embodiment, process 300 or a portion thereof is collectively implemented by a system that manages transportation efficiencies for vehicles—for example, on behalf of an organization with a fleet of vehicles, a municipality on behalf of its residents, and so on and so forth.

In at least one embodiment, process 300 comprises a step 302 to query market energy price. In various embodiments, a first database is used to collect, store, and retrieve market energy prices and the database may include both current and historical energy prices. Market energy prices may be collected periodically and at regular intervals. In some embodiments, forecasted energy prices are determined using time series analysis, machine learning models, or other forecasting models. A determination may be made regarding a current or forecasted energy price compared against a threshold energy price. In some embodiments, a web service API call is submitted with a query request to the database, in other embodiments, the energy prices are stored locally, for example, on a hard disk drive of the system performing process 300.

In at least one embodiment, process 300 comprises a step 304 to determine whether the market energy price exceeds a threshold. In various embodiments, the threshold is a predetermined value. In some embodiments, the mechanism for triggering efficiency strategies involves receiving an indication from an external source. For example, an energy regulating organization may provide a notification indicating an energy shortage that can be used in lieu of a determination that the market energy price exceeds a threshold. Regardless of the mechanism used to determine whether to trigger efficiency strategies, the system will return to step 302 if the condition(s) is/are not met, according to at least one embodiment.

In at least one embodiment, process 300 comprises a step 306 to query connected vehicle data to identify efficiency characteristics of a vehicle. The connected vehicle data may be queried from a database (e.g., same or different from the database that stores market energy prices). The actual energy efficiency of vehicles may be measured, collected, and then queried. In various embodiments, connected vehicle platforms measures parameters that enable the estimation of the impact from possible software-enabled "high efficiency" calibration. For example, the operating characteristics and capabilities of various vehicles may be collected and used to model high-efficiency estimates of how the vehicle may be able to operate in a more energy efficient manner.

In at least one embodiment, process 300 comprises a step 308 to categorize the vehicle based on efficiency. In various embodiment, the categorizations may include high- and low-efficiency vehicles. In some embodiments, characteristics of the vehicle may include whether the vehicle can be used for carpooling, carsharing, support high-efficiency operation, and so on.

In at least one embodiment, process 300 comprises a step 310 to implement strategy for high-efficiency vehicle if the vehicle efficiency exceeds a threshold. In various embodiments, a strategy for prioritizing high-efficiency vehicles may involve prioritizing "charge now" behavior if the vehicle is designated as a high-efficiency option. In various embodiments, the default drive mode of high-efficiency vehicles may be set to a "high efficiency" mode with a potential over-the-air (OTA) delivery of a temporary ultra-efficiency mode if not typically available. In various embodiments, incremental energy loss from events where high efficiency mode is switched off is tracked. Some or all of these techniques may be applied to connected vehicle platforms, for example, based on whether a particular vehicle is high efficiency or low efficiency.

In at least one embodiment, process 300 comprises a step 312 to implement strategy for low-efficiency vehicle if the vehicle efficiency does not exceed the threshold. In various embodiments, system implements a strategy for prioritizing grid arbitrage for low-efficiency vehicles. System may transmit message sets vehicles to operate in a "battery mode" such that ancillary vehicle functionality such as power-consuming modules, non-essential lighting, etc. are turned off to support bi-directional battery capacity. Low-efficiency vehicles may be more valuable for grid arbitrage using their batteries while smaller vehicles and shared ride vehicles may become more valuable for freeing up battery capacity of larger vehicles.

In at least one embodiment, process 300 comprises a step 314 to track participation in efficiency measures. In various embodiments, a database is utilized to track customer participation in efficiency measure(s) to unlock benefits. For example, efficiency of customer transportation may be tracked and reported. The resulting battery capacity increase for bi-directional power transfer may enable monetary benefits (e.g., grid arbitrage of actual price of electricity and environmental impact credits, rather than a customer-facing subsidized price) as well as non-monetary benefits (e.g., priority for accessing energy from charging stations if there are restrictions). Efficiency may be tracked at a trip-level rather than simply based on the movement of a single mode of transportation. For example, if more than one mode of transportation is used (e.g., a traveler takes a train to a carshare vehicle at a transit station near the destination and displacing vehicle only trip, carpooling, use of low-speed electric vehicles or micro-mobility, e-bikes, etc.)

Figure 4:
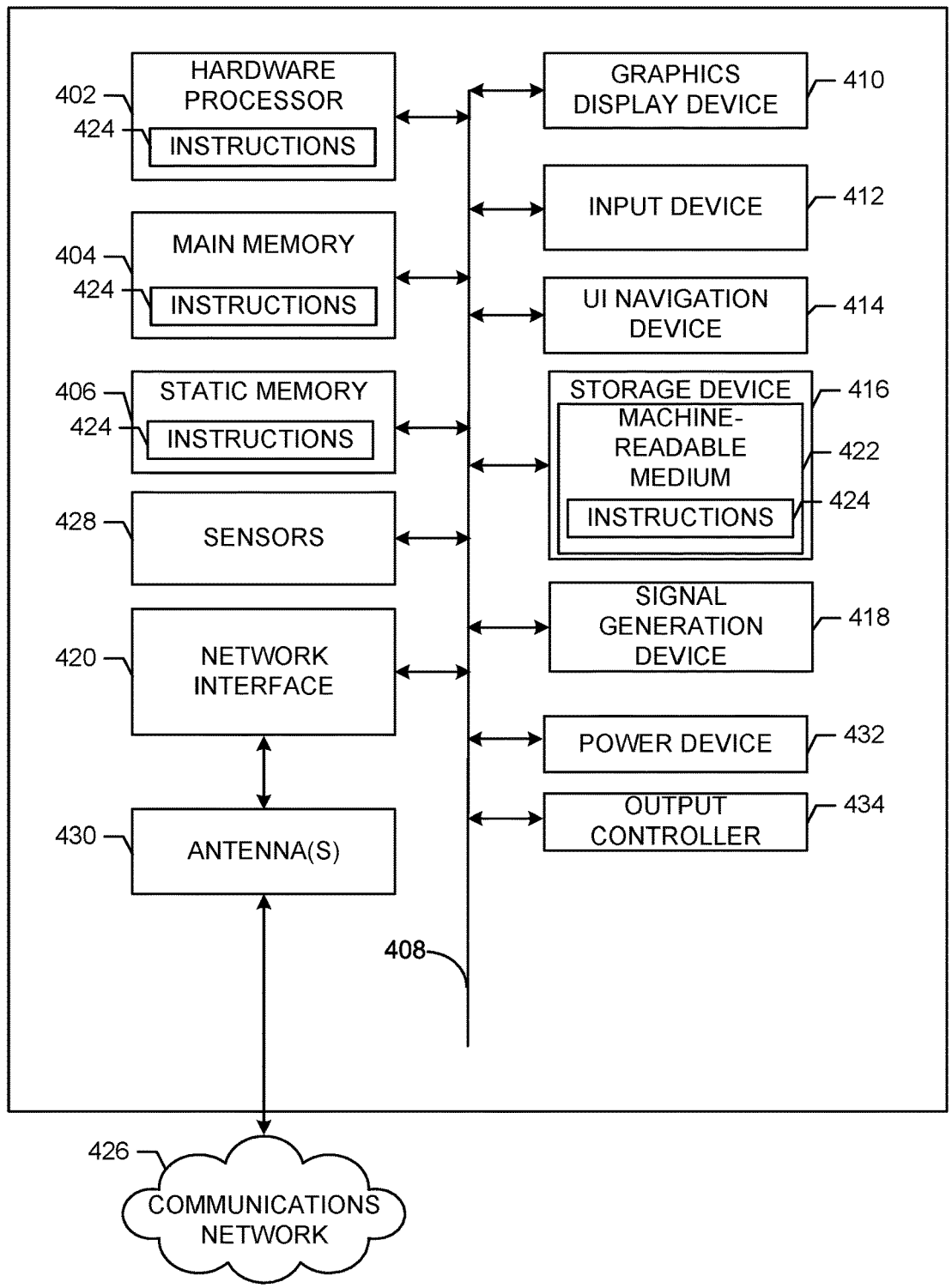
FIG. 4 illustrates a block diagram of an example of a machine or system upon which any one or more of the techniques (e.g., methodologies) discussed herein may be performed.

FIG. 4 illustrates a block diagram of an example of a machine 400 or system upon which any one or more of the techniques (e.g., methodologies) discussed herein may be performed. The machine (e.g., computer system) 400 may include any combination of the illustrated components. For example, the machine 400 may include a hardware processor 402 (e.g., a central processing unit (CPU), a graphics processing unit (GPU), a tensor processing unit (TPU) including an artificial intelligence application-specific integrated circuit (ASIC), a hardware processor core, or any combination thereof), a main memory 404 and a static memory 406, some or all of which may communicate with each other via an interlink (e.g., bus) 408. The machine 400 may further include a power management device 432, a graphics display device 410, an alphanumeric input device 412 (e.g., a keyboard), and a user interface (UI) navigation device 414 (e.g., a mouse). In an example, the graphics display device 410, alphanumeric input device 412, and UI navigation device 414 may be a touch screen display. The machine 400 may additionally include a storage device (i.e., drive unit) 416, a signal generation device 418 (e.g., a data signal), a network interface device/transceiver 420 coupled to antenna(s) 430, and one or more sensors 428, such as a sound detecting sensor (e.g., a microphone), accelerometers, magnetometers, location sensors, and the like. The machine 400 may include an output controller 434, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within the static memory 406, or within the hardware processor 402 during execution thereof by the machine 400. In an example, one or any combination of the hardware processor 402, the main memory 404, the static memory 406, or the storage device 416 may constitute machine-readable media. In various embodiments, a vehicle's controller system is implemented using one or more machines (e.g., machine 400).

While the machine-readable medium 422 is illustrated as a single medium, the term "machine-readable medium" may include a single medium or multiple media (e.g., a centralized or distributed database, and/or associated caches and servers) configured to store the one or more instructions 424.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 400 and that cause the machine 400 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device/transceiver 420 utilizing any one of a number of transfer protocols (e.g., frame relay, internet protocol (IP), transmission control protocol (TCP), user datagram protocol (UDP), hypertext transfer protocol (HTTP), etc.). Example communications networks may include DOCSIS, fiber optic, a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 420 may include one or more physical jacks (e.g., Ethernet, coaxial, or phone jacks) or one or more antennas to connect to the communications network 426. In an example, the network interface device/transceiver 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cable box, a wearable smart device, cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a wearable smart device, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, DOCSIS, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A system, comprising:
one or more processors; and
memory storing executable instructions that, as a result of execution by the one or more processors, causes the system to:
query, from a first database, a market energy price;
determine that the market energy price exceeds a threshold;
query, from a second database and in response to the market energy price exceeding the threshold, connected vehicle data to identify efficiency characteristics of a vehicle, wherein the connected vehicle data includes information about an energy consumption value per passenger mile traveled associated with the vehicle and capacity and utilization information of the vehicle;
determine, based on the energy consumption value per passenger mile traveled and the vehicle and capacity and utilization information, a first efficiency category for the vehicle, wherein the first category is from among a plurality of efficiency categories; and
implement an energy efficiency strategy for the vehicle based at least in part on the first efficiency category.

2. The system of claim 1, wherein:
to determine the first efficiency category, the system further:
determines an estimated efficiency value for the vehicle; and
determines that the estimated efficiency value exceeds a predefined threshold value and wherein the first efficiency category indicates that the vehicle is a high-efficiency vehicle; and the energy efficiency strategy for the high-efficiency vehicle comprises one or more of:
prioritizing charging of the vehicle;
defaulting a vehicle mode of operation to a high-efficiency mode; and
tracking incremental energy loss where the high-efficiency mode is disabled.

3. The system of claim 2, wherein the energy efficiency strategy is delivered to the vehicle via an over-the-air (OTA) update.

4. The system of claim 1, wherein:
the first efficiency category indicates that the vehicle is a low-efficiency vehicle; and
the energy efficiency strategy for the low-efficiency vehicle comprises one or more of:
prioritizing bi-directional charger access of the vehicle;
defaulting a vehicle mode of operation to a high-efficiency mode where functionalities separate from battery storage for grid arbitrage may be switched off; and
enabling one or more grid arbitrage benefits for an owner of the low-efficiency vehicle.

5. The system of claim 4, wherein the one or more grid arbitrage benefits comprise:
access to unsubsidized energy prices; and
priority use of charging stations by one or more other higher-efficiency vehicles accessible by the owner.

6. The system of claim 1, wherein the executable instructions include further instructions that, as a result of execution by the one or more processors, further causes the system to:
track customer participation in the energy efficiency strategy.

7. The system of claim 1, wherein the first efficiency category is determined based on actual efficiency of the vehicle or estimated efficiency of the vehicle in a high-efficiency mode.

8. A method, comprising:
querying, by one or more processors and from a first database, a market energy price;
determining, by the one or more processors, that the market energy price exceeds a threshold;
querying, by the one or more processors and in response to the market energy price exceeding the threshold, from a second database, connected vehicle data to identify efficiency characteristics of a vehicle, wherein the connected vehicle data includes information about an energy consumption value per passenger mile traveled associated with the vehicle and capacity and utilization information of the vehicle;
determining, by the one or more processors and based on the energy consumption value per passenger mile traveled and the vehicle and capacity and utilization information, a first efficiency category for the vehicle, wherein the first efficiency category is from among a plurality of efficiency categories; and
implementing, by the one or more processors, an energy efficiency strategy for the vehicle based at least in part on the first efficiency category.

9. The method of claim 8, wherein determining the first efficiency category further comprising:
determining an estimated efficiency value for the vehicle; and
determining that the estimated efficiency value exceeds a predefined threshold value, wherein the first efficiency category indicates that the vehicle is a high-efficiency vehicle; and
the energy efficiency strategy for the high-efficiency vehicle comprises one or more of:
prioritizing charging of the vehicle;
defaulting a vehicle mode of operation to a high-efficiency mode; and
tracking incremental energy loss where the high-efficiency mode is disabled.

10. The method of claim 9, wherein the energy efficiency strategy is delivered to the vehicle via an over-the-air (OTA) update.

11. The method of claim 8, wherein:
the first efficiency category indicates that the vehicle is a low-efficiency vehicle; and
implementing the energy efficient strategy for the low-efficiency vehicle comprises one or more of:
prioritizing bi-directional charger access of the vehicle;
defaulting a vehicle mode of operation to a high-efficiency mode where functionalities separate of battery storage for grid arbitrage may be switched off; and
enabling one or more grid arbitrage benefits for an owner of the low-efficiency vehicle.

12. The method of claim 11, wherein the one or more grid arbitrage benefits comprise:
access to unsubsidized energy prices; and
priority use of charging stations by one or more other higher-efficiency vehicles accessible by the owner.

13. The method of claim 8, further comprising, tracking, by the one or more processors, customer participation in the energy efficiency strategy.

14. The method of claim 8, wherein the categorization is determined based on actual efficiency of the vehicle or estimated efficiency of the vehicle in a high-efficiency mode.

15. A non-transitory computer-readable storage medium storing executable instructions that, as a result of being executed by one or more processors of a computer system, cause the computer system to at least:
query, from a first database, a market energy price;
determine that the market energy price exceeds a threshold;
query, from a second database and based on the market energy price exceeding the threshold, connected vehicle data to identify efficiency characteristics of a vehicle, wherein the connected vehicle data includes information about an energy consumption value per passenger mile traveled associated with the vehicle and capacity and utilization information of the vehicle;
determine, based on the energy consumption value per passenger mile traveled and the vehicle and capacity and utilization information, a first efficiency category for the vehicle, wherein the first efficiency category is from among a plurality of efficiency categories; and
implement an energy efficiency strategy for the vehicle based at least in part on the first efficiency category.

16. The non-transitory computer-readable storage medium of claim 15,
wherein to determine the first efficiency category, the executable instructions further cause the computer system to:
determine an estimated efficiency value for the vehicle; and
determine that the estimated efficiency value exceeds a predefined threshold value, wherein the first efficiency category indicates that the vehicle is a high-efficiency vehicle; and
the energy efficiency strategy for the high-efficiency vehicle comprises one or more of:
prioritizing charging of the vehicle;

defaulting a vehicle mode of operation to a high-efficiency mode; and tracking incremental energy loss where the high-efficiency mode is disabled.

17. The non-transitory computer-readable storage medium of claim 16, wherein the energy efficiency strategy is delivered to the vehicle via an over-the-air (OTA) message.

18. The non-transitory computer-readable storage medium of claim 15, wherein:

the first efficiency category indicates that the vehicle is a low-efficiency vehicle; and the energy efficiency strategy for the low-efficiency vehicle comprises enabling one or more grid arbitrage benefits for an owner of the low-efficiency vehicle.

19. The non-transitory computer-readable storage medium of claim 18, wherein the one or more grid arbitrage benefits comprise:

access to unsubsidized energy prices; and priority use of charging stations by one or more other higher-efficiency vehicles accessible by the owner.

20. The non-transitory computer-readable storage medium of claim 15, wherein the executable instructions as a result of execution by the one or more processors, further causes the computer system to:

track customer participation in the energy efficiency strategy.

* * * * *